United States Patent [19]

Strugach

[11] Patent Number: 5,539,262

[45] Date of Patent: *Jul. 23, 1996

[54] AXIALLY FOCUSED RADIAL MAGNET VOICE COIL ACTUATOR

[75] Inventor: Michael G. Strugach, Calabasas, Calif.

[73] Assignee: Aura Systems, Inc., El Segundo, Calif.

[ * ] Notice: The term of this patent shall not extend beyond the expiration date of Pat. No. 5,434,458.

[21] Appl. No.: 285,405

[22] Filed: Aug. 3, 1994

[51] Int. Cl.⁶ .................................................. H02K 41/00
[52] U.S. Cl. .................................................. 310/13; 310/12
[58] Field of Search .................................. 310/12, 13, 14; 318/135

[56] References Cited

U.S. PATENT DOCUMENTS

| | | | |
|---|---|---|---|
| 5,402,021 | 5/1995 | Johnson | 310/12 |
| 5,434,458 | 7/1995 | Stuart et al. | 310/13 |

Primary Examiner—Steven L. Stephan
Assistant Examiner—Judson H. Jones
Attorney, Agent, or Firm—Anthony T. Cascio; Lisa A. Merkadeau

[57] ABSTRACT

A novel voice coil actuator is disclosed having a magnetic flux conductive material core, an axially focused, radially oriented magnet structure, and an electrical current conductive coil. The core has a first surface and a continuous channel disposed in the first surface. The channel has a first wall and a second opposing wall, the first wall defining a recess. The magnet structure is disposed in the recess of the first wall and spaced from the second wall so that a gap remains between the magnet structure and the second wall. The magnet structure includes a first radially polarized magnet having an axially extending surface defining an upper edge and a lower edge, a second axially polarized magnet having a second magnet radially extending surface extending radially inward from the first magnet upper edge, and a third axially polarized magnet having a third magnet radially extending surface extending radially inward from the first magnet lower edge. The electrical current conductive coil is moveably suspended in the gap such that an electrical current in the coil develops a magnetic force on the coil in a direction substantially normal to the magnetic flux to displace the coil in response to the magnetic force.

19 Claims, 2 Drawing Sheets

AXIALLY FOCUSED RADIAL MAGNET VOICE COIL ACTUATOR

FIELD OF THE INVENTION

The present invention relates generally to voice coil actuators having radially oriented magnets, and more particularly to voice coil actuators having an annular radially oriented magnet structure.

BACKGROUND OF THE INVENTION

A known typical voice coil actuator is comprised of a core, an axially polarized cylindrical magnet, a base plate, a rod, and two pole pieces. The rod and the magnet are coaxially mounted on the base plate, such that the rod extends through the center of the magnet. The two pole pieces are coaxially mounted respective to the magnet and the rod. The first pole piece has an inner diameter less than the inner diameter of the cylindrical magnet and the second pole piece has an inner diameter greater than the diameter of the rod. Therefore, a gap remains between the facing sides of the pole pieces. A coil is coaxially suspended within the gap.

In co-pending application Ser. No. 07/925,085, also assigned to the assignee of the present application, and incorporated by reference herein, a voice coil actuator utilizing radially oriented magnets is disclosed. The voice coil actuator includes a magnetic flux conductive material core, a magnet and an electrical current conductive coil. The core has a first surface and a continuous channel disposed in the first surface. The channel has a pair of opposing walls. The magnet is disposed in intimate contact with a first wall and spaced from an opposing wall so that a gap remains between the magnet and the opposing wall. The magnet has a first face of a first magnetic polarity facing the first wall and a second face of a second, opposite magnetic polarity facing the gap. The magnet is further spaced from a bottom of the channel so that magnetic flux is substantially normal from the second face across the gap to the opposing wall. The electrical current conductive coil is disposed moveably in the gap such that an electrical current in the coil develops a magnetic force on the coil in a direction substantially normal to the magnetic flux to displace the coil in response to the magnetic force.

The use of radially oriented magnets in the voice coil actuator minimizes flux leakage from the core, and thereby maximizes efficiency. It is desirable, however, to also reduce the radially oriented magnet structures weight or mass, while retaining the high level of magnetic flux density. Alternatively, it may be desirable to increase the level of magnetic flux density without increasing the weight and mass of the radially oriented magnet structure.

Therefore, a need exists for a radially oriented magnet structure that provides a high level of magnetic flux density without requiring increased weight or mass of the magnet structure.

SUMMARY OF THE INVENTION

It is therefore an object of the present invention to provide low mass and low weight radially oriented magnet structure that provides a high level of magnetic flux density.

According to the present invention, a voice coil actuator comprises a magnetic flux conductive material core, an axially focused, radially oriented magnet structure, and an electrical current conductive coil. The core has a first surface and a continuous channel disposed in the first surface. The channel has a first wall and a second opposing wall, the first wall defining a recess. The magnet structure is disposed in the recess of the first wall and spaced from the second wall so that a gap remains between the magnet structure and the second wall. The magnet structure includes a first radially polarized magnet having an axially extending surface defining an upper edge and a lower edge, a second axially polarized magnet having a second magnet radially extending surface extending radially inward from the first magnet upper edge, and a third axially polarized magnet having a third magnet radially extending surface extending radially inward from the first magnet lower edge. The electrical current conductive coil is moveably suspended in the gap such that an electrical current in the coil develops a magnetic force on the coil in a direction substantially normal to the magnetic flux to displace the coil in response to the magnetic force.

It is a feature of the present invention that the flux vectors generated by the axially and radially oriented magnets are combined to focus into a radially oriented flux path.

It is a feature of the present invention that the magnetic structure in the voice coil actuator is radially oriented to maximize efficiency of the magnet structure.

It is another feature of the present invention that the magnet structure has a low weight and mass.

It is yet another feature of the present invention that the magnet structure provides a high level of magnetic flux density.

These and other objects, advantages and features of the present invention will become readily apparent to those skilled in the art from a study of the following Description of an Exemplary Preferred Embodiment when read in conjunction with the attached Drawing and appended Claims.

DESCRIPTION OF AN EXEMPLARY PREFERRED EMBODIMENT

Figure 1:
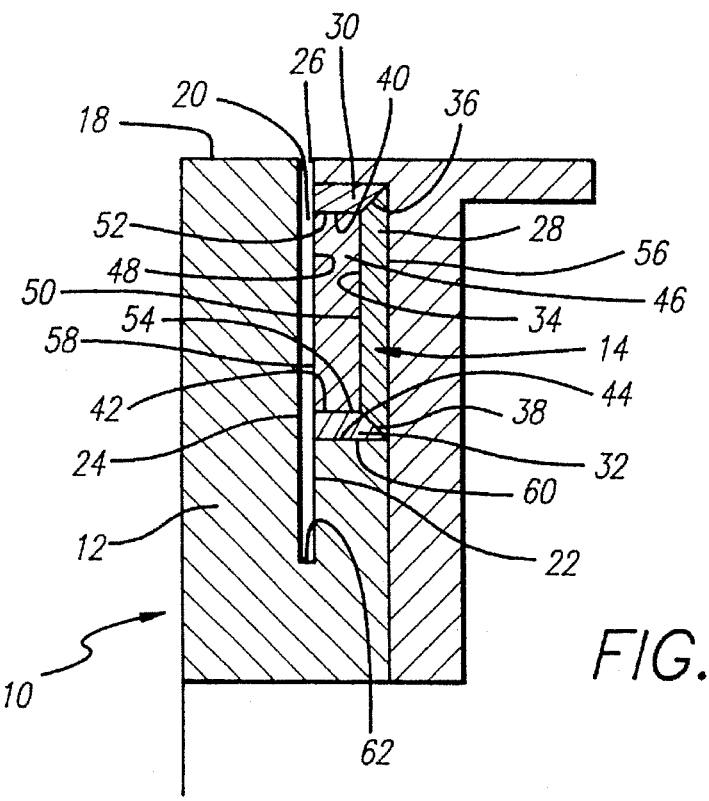
FIG. 1 is a partial cross-sectional view of an axially focused, radially oriented magnet structure voice coil actuator of the present invention.

Referring first to FIG. 1, there is shown, in partial view, a novel voice coil actuator 10 constructed according to the principles of the present invention. The actuator 10 includes a core 12, a magnet structure 14 and an electrical current conductive coil (not shown in FIG. 1). For reasons which will be described in greater detail hereinbelow, a feature of the present invention is that the magnet structure 14 provides high magnetic flux density without requiring magnet having a large mass. Moreover, a magnetic pole of the magnet structure 14 is adjacent a gap in which the coil 16 is suspended so that the nonuniformity and fringing of the magnetic field is minimized.

Figure 2:
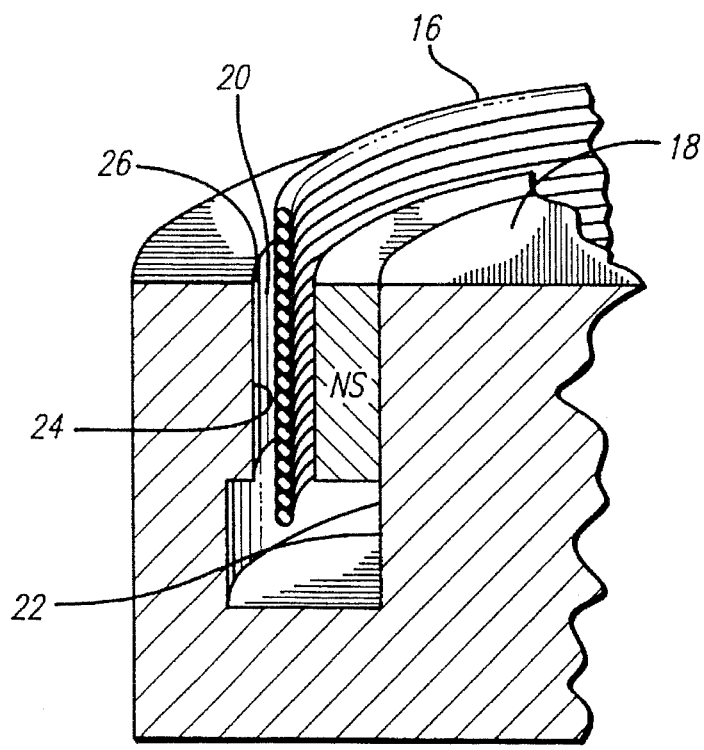
FIG. 2 is a cross-sectional view of another embodiment of a voice coil actuator having a radially oriented magnet, and FIG. 3. is a cross-sectional view of the voice coil actuator of FIG. 2 adapted for use in a loudspeaker.
Figure 3:
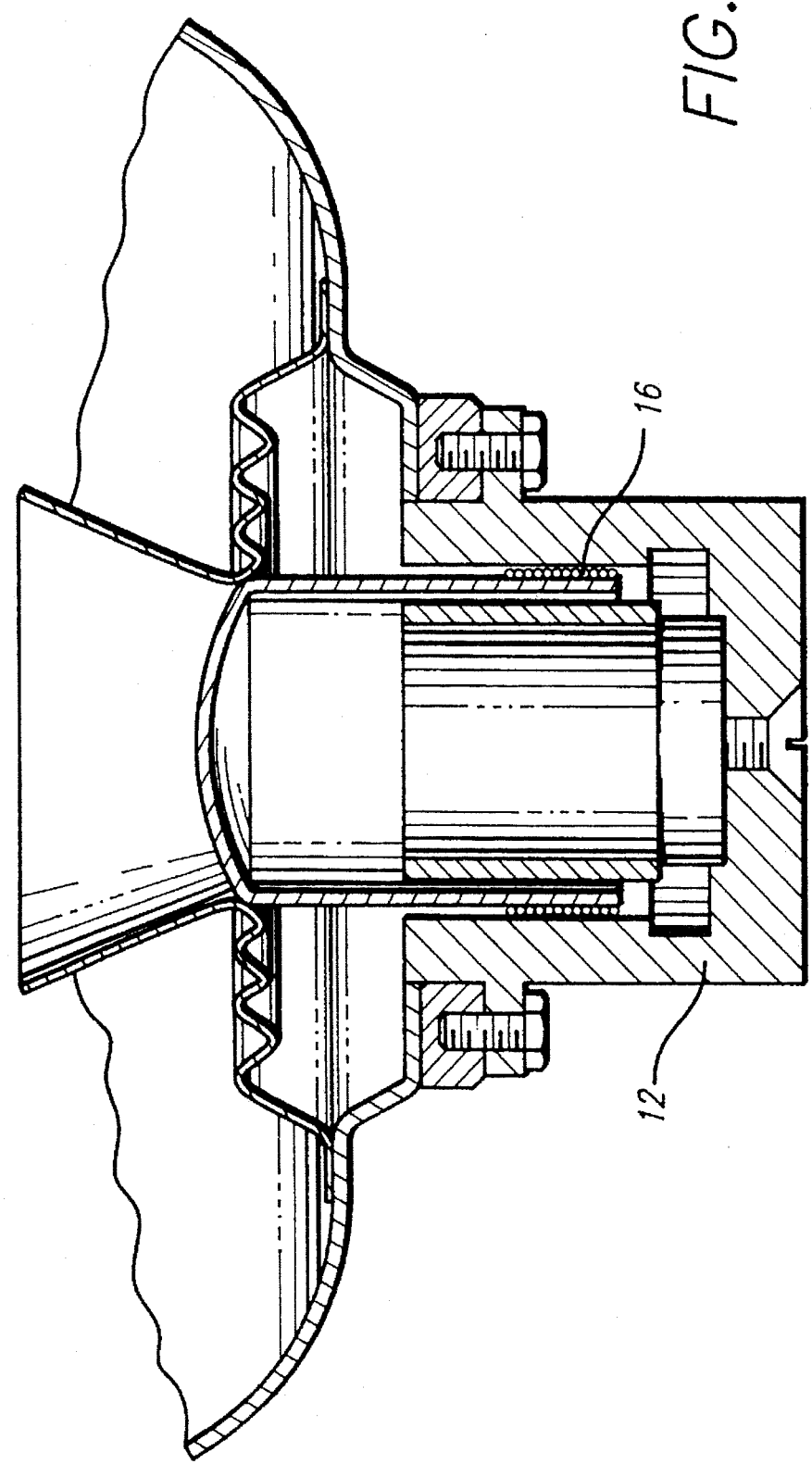

Referring now to FIGS. 1–3, the construction of the voice coil actuator 10 is described. The core 12 is constructed from magnetic flux conductive material and has a first surface 18 and a continuous channel 20 disposed in the first surface 18. The channel 20 has a first wall 22 and a second opposing wall 24. In the embodiment shown in FIG. 1, the first wall 22 is the outer wall and the second opposing wall 24 is the inner wall. However, in the embodiment shown in FIGS. 2–3, the first wall 22 is the inner wall and the second opposing wall 24 is the outer wall. For convenience, the first wall is hereinafter referred to as the first outer wall, and the second wall is referred to as the second inner wall. It is to be understood, however, that alternatively the first wall may be the inner wall, and the second opposing wall the outer wall.

The magnet structure 14, shown in FIG. 1, is disposed in intimate contact with the outer first wall 22 so that a gap 26 remains between the magnet structure 14 and the inner opposing wall 24. Alternatively, as shown in FIGS. 2–3, the magnet 54 could be mounted to the inner wall 22 and spaced from the outer wall 24.

Referring again to FIG. 1, the magnetic structure 14 of the present invention is described in detail. The magnet structure 14 is disposed in a recess 44 of the first outer wall 22 and spaced from the second inner wall 24 so that the gap 26 remains between the magnet structure 14 and the second inner wall 24. The magnet structure includes a first radially polarized magnet 28, a second axially polarized magnet 30, and a third axially polarized magnet 32. The first radially polarized magnet 28 includes an axially extending surface 34 that defines an upper edge 36 and a lower edge 38. The upper and lower edges 36, 38 are chamfered at approximately 135 degree angles from the axially extending surface 34, with the lower edge 38 extending downward from the axially extending surface 34 and the upper edge 36 extending upward from the axially extending surface 34. The second axially polarized magnet 30 includes a second magnet radially extending surface 40 that extends radially inward from the first magnet upper edge 36. The third axially polarized magnet 32 has a third magnet radially extending surface 42 that extends radially inward from the first magnet lower edge 38. Preferably, the first magnet axially extending surface 34 has a length greater than each of the second magnet radially extending surface 40 and the third magnet radially extending surface 42.

The magnet structure 14 further includes a focuser plate 46. The focuser plate defines an inner surface 48, an outer surface 50, an upper surface 52, and a lower surface 54. The focuser plate outer surface 50 is disposed adjacent the first magnet axially extending surface 34. The focuser plate 34 extends axially from the first magnet upper edge to the first magnet lower edge. The focuser plate 46 also preferably extends radially inward from the first magnet axially extending surface for approximately the same length as the second and third magnet radially extending surfaces extend radially inward from the first magnet upper edge. The upper surface 52 of the focuser plate is preferably adjacent the second magnet radially extending surface 40, and the focuser plate lower surface 54 is preferably adjacent the third magnet radially extending surface 42. The focuser plate is preferably constructed from a soft magnetic material. In the voice coil actuator embodiment shown in FIG. 1, the magnet structure 14 and focuser plate 46 are annular in cross-section.

The first radially polarized magnet 28 has a first polarity facing the focuser plate 46 and gap 26 and a second opposite polarity facing the outer first wall 22. The second and third axially polarized magnets 30, 32 have the same polarity facing the focuser plate 46 as the first magnet, such that the same polarities of magnetization of each of the three magnets 28, 30, 32 are adjacent the focuser plate 46. Therefore, the first, second and third magnets 28, 30, 32 are each polarized and arranged such that the same polarities are adjacent the focuser plate 46.

The flux developed by the axially oriented magnets 30, 32 serve to focus the flux developed by the radially oriented magnet 28, thereby preventing fringing of the flux in a non-radial direction. More specifically, the purpose of the second and third axially polarized magnets 30, 32 is to focus the magnetic field developed by the first radially oriented magnet within the gap, thereby creating a more efficient magnet structure. The angle of chamfering of the upper and lower edges of the first magnet causes the flux vectors generated at the joining corners of the magnet structure to be additive and focused in a radial direction.

In the embodiment shown in FIG. 1, the magnet structure 14 has a first face 56 of a first magnetic polarity adjacent the outer first wall 22 and a second face 58 of a second, opposite magnetic polarity facing the gap 26. The magnet structure 14 has a lower edge 60 spaced from a bottom wall 62 of the channel 20 so that the magnetic flux is substantially confined normal from the second face 58 of the magnet structure 14 across the gap 26 to the inner second wall 24. More particularly, the spacing of the lower edge 60 of the magnet structure 14 from the bottom wall 62 of the channel 20 is selected to be larger than the width of the gap 26 between the magnet structure 14 and the inner second wall 24 in order to prevent undesirable fringing of the flux path.

The coil 16 is moveably suspended in the gap, as shown in FIGS. 2 and 3, such that an electrical current in the coil 16 develops a Lorentz force on the coil 16 in a direction substantially normal to the radial magnetic flux to displace the coil 16 in response to such magnetic force. Of course, when the coil 16 is coaxially suspended in the gap, the force will be axial and linearly proportional to the current, as is well known. It is known by various means to suspend the coil 16.

An application of the novel voice coil actuator 10 is in a loudspeaker as shown in FIG. 3. The loudspeaker includes a speaker cone mechanically connected to the coil through a carrier, and a resilient expandable member, known as a spider, attachable to each of the core and the coil to suspend the coil in its zero current bias position. The arrangement of the cone and resilient member are well known. The core may include an annular mounting flange to which a conventional basket may be mounted. The resilient member is conventionally attached to the carrier and the basket.

There has been described hereinabove an exemplary preferred embodiment of a magnetic structure for a voice coil actuator. Those skilled in the art may now make numerous uses of and departures from the above described inventive concepts without departing from the inventive concepts disclosed herein. Accordingly, the present invention is to be defined solely by the scope of the following claims.

I claim:

1. A magnet design for a voice coil actuator defining a central axis, comprising:

a first magnet, said first magnet being radially polarized and having an axially extending surface defining an upper edge and a lower edge;

a second magnet, said second magnet being axially polarized and having a second magnet radially extending surface extending radially inward from said first magnet upper edge; and a third magnet, said third magnet being axially polarized and having a third magnet radially extending surface extending radially inward from said first magnet lower edge.

2. A magnet design in accordance with claim 1 further comprising a focuser plate, said focuser plate disposed adjacent said first magnet axially extending surface.

3. A magnet design in accordance with claim 2 wherein said focuser plate extends axially from said first magnet upper edge to said first magnet lower edge.

4. A magnet design in accordance with claim 3 wherein said focuser plate extends radially inward from said first magnet axially extending surface approximately the same length as said second magnet radially extending surface extends radially inward from said first magnet upper edge.

5. A magnet design in accordance with claim 1 wherein said magnets are annular in shape.

6. A magnet design in accordance with claim 2 wherein said focuser plate is annular in shape.

7. A magnet design in accordance with claim 1 wherein said first magnet axially extending surface has a length greater than both said second magnet radially extending surface and said third magnet radially extending surface.

8. A magnet design in accordance with claim 1 wherein said first magnet further comprises an upper surface and a lower surface, said upper surface and lower surface being chamfered from said axially extending surface, and said second magnet further comprising a second magnet outer surface chamfered from said second magnet radially extending surface so as to correspond to said first magnet upper surface and said third magnet having a third magnet outer surface chamfered from said third magnet radially extending surface so as to correspond to said first magnet lower surface.

9. A magnet design in accordance with claim 8 wherein said upper surface and said lower surface are chamfered at an approximately 135 degree angle from said axially extending surface.

10. A voice coil actuator comprising:
   a magnetic flux conductive material core having a first surface and a continuous channel disposed in said first surface, said channel having a first wall and a second opposing wall, said first wall defining a recess;
   a magnet structure disposed in said recess of said first wall and spaced from said second wall so that a gap remains between said magnet structure and said second wall, said magnet structure further comprising a first radially polarized magnet having an axially extending surface defining an upper edge and a lower edge, a second axially polarized magnet having a second magnet radially extending surface extending radially inward from said first magnet upper edge, and a third axially polarized magnet having a third magnet radially extending surface extending radially inward from said first magnet lower edge; and
   an electrical current conductive coil moveably suspended in said gap such that an electrical current in said coil develops a magnetic force on said coil in a direction substantially normal to said magnetic flux to displace said coil in response to said magnetic force.

11. A voice coil actuator in accordance with claim 10 wherein said magnet structure is spaced from a bottom of said channel.

12. A voice coil actuator in accordance with claim 10 further comprising a focuser plate, said focuser plate disposed adjacent said first magnet axially extending surface.

13. A voice coil actuator in accordance with claim 12 wherein said focuser plate extends axially from said first magnet upper edge to said first magnet lower edge.

14. A magnet design in accordance with claim 13 wherein said focuser plate extends radially inward from said first magnet axially extending surface approximately the same length as said second magnet radially extending surface extends radially inward from said first magnet upper edge.

15. A voice coil actuator in accordance with claim 10 wherein said magnet structure is annular in shape.

16. A voice coil actuator in accordance with claim 12 wherein said focuser plate is annular in shape.

17. A voice coil actuator in accordance with claim 10 wherein said first magnet axially extending surface has a length greater than both said second magnet radially extending surface and said third magnet radially extending surface.

18. A voice coil actuator in accordance with claim 10 wherein said first magnet further comprises an upper surface and a lower surface, said upper surface and lower surface being chamfered from said axially extending surface, and said second magnet further comprising a second magnet outer surface chamfered from said second magnet radially extending surface so as to correspond to said first magnet upper surface and said third magnet having a third magnet outer surface chamfered from said third magnet radially extending surface so as to correspond to said first magnet lower surface.

19. A voice coil actuator in accordance with claim 18 wherein said upper surface and said lower surface are chamfered at an approximately 135 degree angle from said axially extending surface.

\* \* \* \* \*